United States Patent [19]

Long et al.

[11] 4,227,538
[45] Oct. 14, 1980

[54] SEPARATOR CONVEYOR FOR PEANUT COMBINE

[75] Inventors: William R. Long; James H. Long, both of Tarboro, N.C.

[73] Assignee: Long Manufacturing N.C., Inc., Tarboro, N.C.

[21] Appl. No.: 947,125

[22] Filed: Sep. 29, 1978

[51] Int. Cl.² ...................... A01D 17/04; A01D 17/08
[52] U.S. Cl. .................... 130/30 C; 56/14.6; 171/119
[58] Field of Search ............ 56/14.6, 327 R, 128, 56/130, 126; 171/119, 120, 83, 63; 130/27 F, 27 R, 30 C, 27 P

[56] References Cited

U.S. PATENT DOCUMENTS

| 359,091 | 3/1887 | Murrow | 171/119 |
|---|---|---|---|
| 432,992 | 7/1890 | Ellsworth | 171/119 |
| 596,573 | 1/1898 | Chatterton | 130/21 |
| 1,049,244 | 12/1912 | Linermon | 130/30 C |
| 1,110,768 | 9/1914 | George | 130/27 P |
| 2,607,180 | 8/1952 | Stankavich et al. | 56/330 |
| 2,833,288 | 5/1958 | Serantin | 130/27 J |
| 2,915,871 | 12/1959 | Furford | 56/330 |
| 3,007,475 | 11/1961 | Long | 130/30 C |
| 3,381,455 | 5/1968 | Mitchell | 56/126 |
| 3,597,905 | 8/1971 | Jarrell | 56/14.6 |
| 3,678,938 | 7/1972 | DeCoene | 130/27 F |
| 3,945,178 | 3/1976 | Delfosse | 56/14.6 |

Primary Examiner—Paul J. Hirsch
Attorney, Agent, or Firm—Dowell & Dowell

[57] ABSTRACT

A peanut combine has a plurality of relatively large threshing cylinders arranged in series with a breastplate underneath having openings of a size to permit peanuts and some extraneous matter to fall therethrough, the vines being carried upwardly by the cylinders, and a conveyor beneath the forward threshing cylinder having openings of a size to permit the passage of some extraneous matter but of a size to retain the peanuts thereon for discharge into a shaker pan beneath an upper threshing cylinder.

1 Claim, 6 Drawing Figures

SEPARATOR CONVEYOR FOR PEANUT COMBINE

BACKGROUND OF THE INVENTION

1. Field of the Invention

This invention relates to agricultural machinery and particularly to a combine employed in the harvesting of crops such as peanuts in which the combine is moved over the ground picking up the crop and separating the marketable portion from the vines and other extraneous material. The invention is particularly directed to the provision for separating and conveying the peanuts from an early stage in the combine to a later collection stage in the combine.

SUMMARY OF THE INVENTION

This invention is embodied in peanut combines of the general type disclosed in Long U.S. Pat. No. 2,974,467. In that patent the combine has a breastplate underneath the first or lower cylinder with openings of a size to permit the passage of dirt but not peanuts, no peanuts being discharged until they reach the portion of the breastplate beneath an upper cylinder.

It is an object of the present invention to permit the discharge of peanuts through the lower portion of the breastplate located beneath the first cylinder along with extraneous material such as dirt in order to reduce the quantity of peanuts passing along the remainder of the breastplate up to the final portion under the last cylinder.

This is achieved by providing openings in the lower portion of the breastplate of a size to permit the passage of peanuts and providing an inclined slatted conveyor member or table beneath the lower breastplate that has openings of a size to permit the discharge of dirt but small enough to prevent the loss of peanuts. Accordingly, the peanuts are carried upwardly and discharged onto the front portion of a shaker pan. In order to accomplish this, the shaker pan shown in the drawing is shortened slightly so that it does not extend forwardly as far as the shaker pan shown in the patent thereby permitting the conveyor to extend up slightly above the level of the front end of the shaker pan.

The conveyor has a sprocket mounted at each end on each side for carrying a pair of endless chains. The chains carry spaced cross elements from each of which extends a wiper blade that engages the upper surface of the conveyor table to move the peanuts upwardly onto the shaker pan, while dirt is discharged through the opening in the table.

DESCRIPTION OF THE PREFERRED EMBODIMENT

Figure 1:
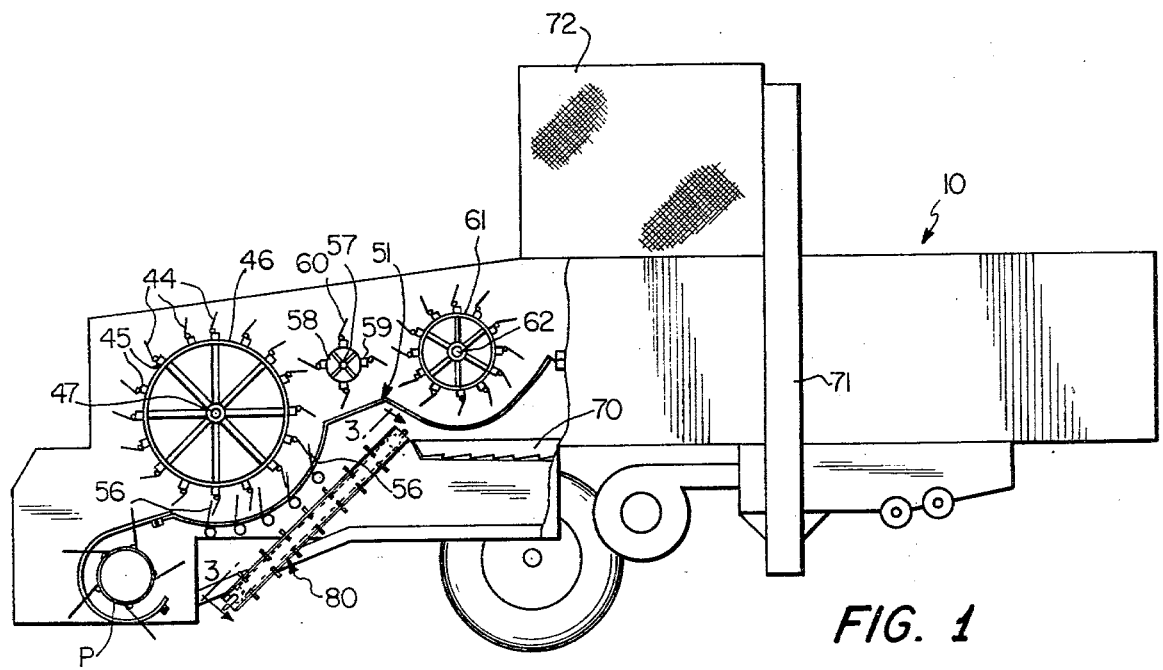
FIG. 1 is a side elevation, with portions removed, of a combine with an embodiment of the present invention.
Figure 2:
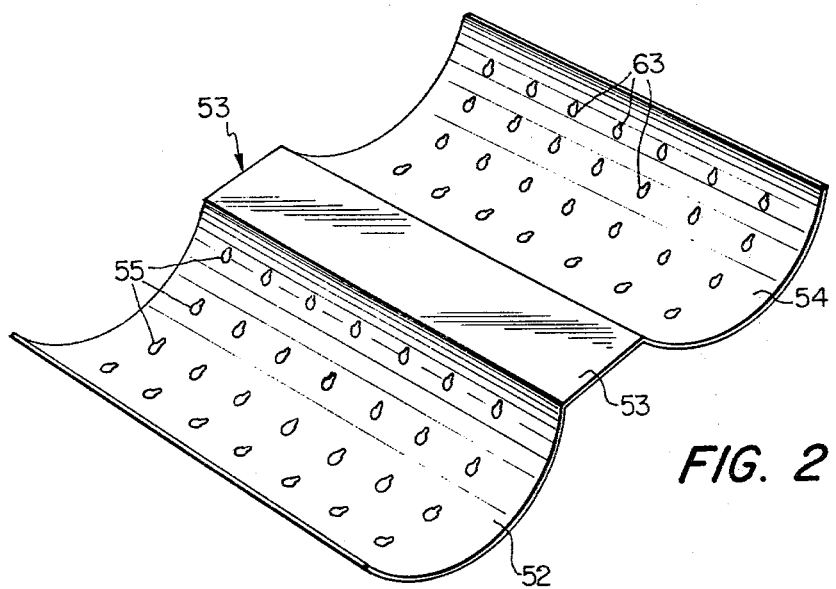
FIG. 2 is an enlarged perspective of a breastplate used in a combine in accordance with the present invention.

With further reference to the drawings, illustrated is a combine 10 of the general type described in Long U.S. Pat. No. 2,974,467 which may be towed through the field by a tractor, not shown, which also may provide power for operation of the combine. If desired, the combine may have an independent power plant mounted thereon for driving the various elements of the combine. As described in that patent, the combine has a pickup P which lifts the peanut vines with the nuts attached and carries them into engagement with spring fingers 44 on spaced bars 45 mounted on a threshing cylinder composed of spaced wheels 46 supported on a shaft 47 which is driven through appropriate means. The threshing cylinder rotates in a counterclockwise direction (as viewed in FIG. 1) to carry the vines rearwardly onto a breastplate 51 having a lower or front concave portion 52 connected by an intermediate portion 53 to an upper or rear concave portion 54. The lower concave portion 52 has openings 55 through which spring fingers 56 project and through which extraneous matter such as dirt can fall. Unlike the breastplate disclosed in U.S. Pat. No. 2,974,467, the openings 55 in accordance with the present invention permit the passage of peanuts whereas those disclosed in the patent do not.

The vines are carried along the breastplate with any peanuts that have not become detached and fallen through the openings 55, until the vines and remaining peanuts reach the rear of the threshing cylinder where they are stripped therefrom by a stripper cylinder. Such stripper cylinder includes a shaft 57 having a disk 58 at each end on which are mounted bars 59 carrying spring fingers 60. The spring fingers 60 travel in a counterclockwise direction (FIG. 1) stripping the vines from the lower or first threshing cylinder, and transferring the vines and peanuts carried thereby to an upper or second threshing cylinder 61 similar to the first threshing cylinder but of smaller diameter.

The second threshing cylinder 61 is mounted on a shaft 62 and driven by suitable means. During the transfer of the vines from the first threshing cylinder to the second threshing cylinder, peanuts continue to be separated from the vines and sift downwardly through the vines to the breastplate 51 where such peanuts are moved across the intermediate imperforate portion 53 of such breastplate to a rear concave portion 54. The rear concave portion of the breastplate is provided with openings 63 through which most of the remaining peanuts may fall as well as some dirt and various extraneous materials.

The vines carried beyond the breastplate 51 pass on to a vine rack as described in U.S. Pat. No. 2,974,467 and eventually are discharged from the rear of the combine.

Peanuts passing through the openings 63 in the rear portion of the breastplate 51 are discharged into a shaker pan 70 in which the peanuts are moved toward the rear of the machine where the peanuts are further cleaned and are discharged from the combine by appropriate means, including by an air lift or other duct 71 into a container 72. However, the pan 70 in the present invention does not extend forwardly as far as that illustrated in the U.S. Pat. No. 2,974,467 in order to permit the use of a conveyor beneath the breastplate as will now be described.

The conveyor includes a table 80 and endless conveyor means for moving peanuts along the table. The table includes side frame members 81, front brace 82 and rear brace 83, between which are mounted a plurality of longitudinally extending slats 84 that may have an inverted U-shaped configuration in cross-section. The slats are spaced apart at a distance of approximately a quarter to three-eighths inch which permits the dropping out of dirt and other foreign matter but retains the peanuts on its upper surface between the side members 81.

Figure 3:
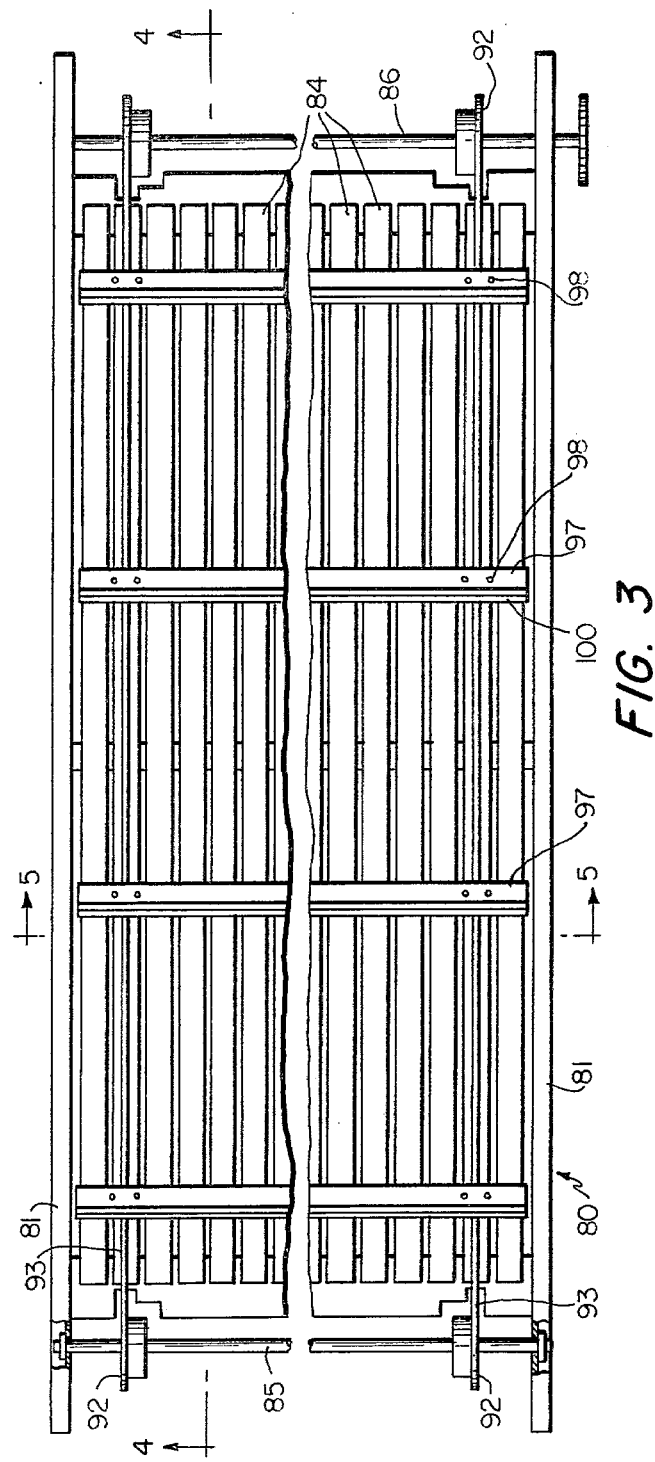
FIG. 3 is an enlarged plan view of a conveyor in accordance with the present invention.
Figure 4:
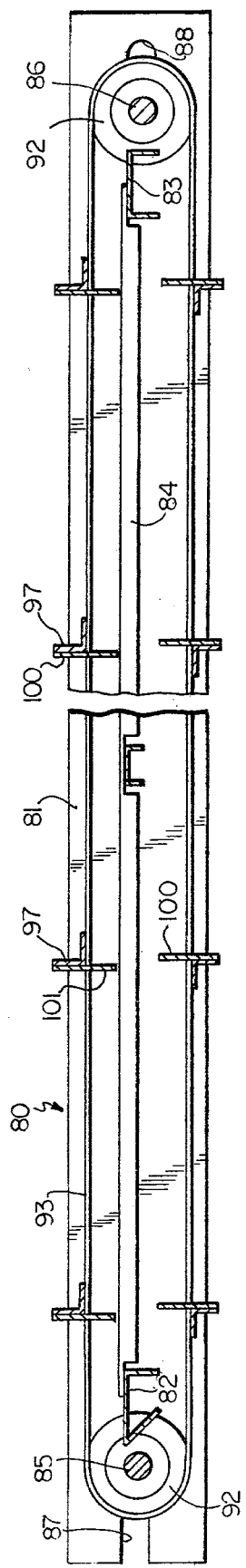
FIGS. 4 and 5 are sections to an enlarged scale on the lines 4—4 and 5—5, respectively, of FIG. 3.
Figure 5:
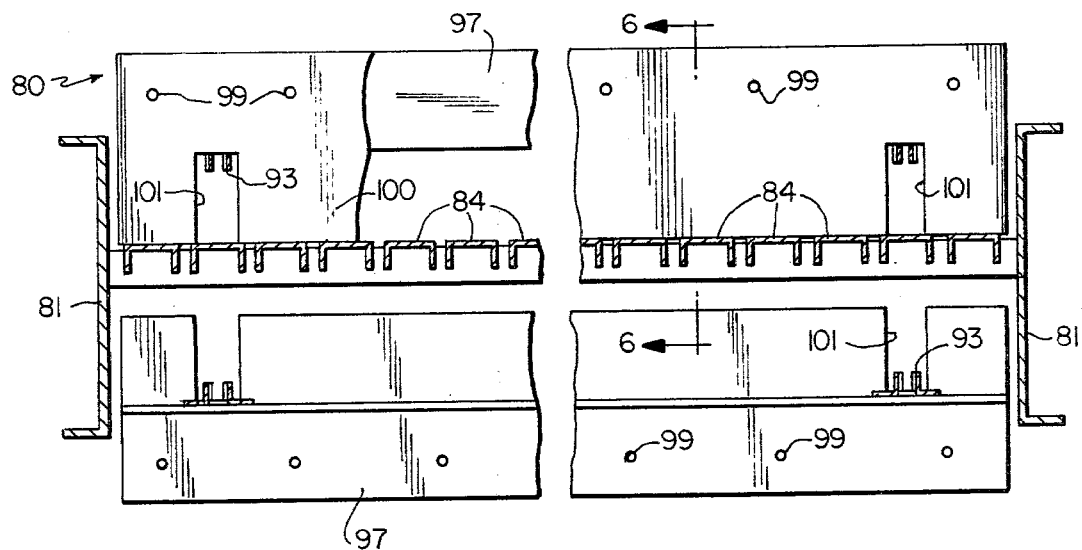
Figure 6:
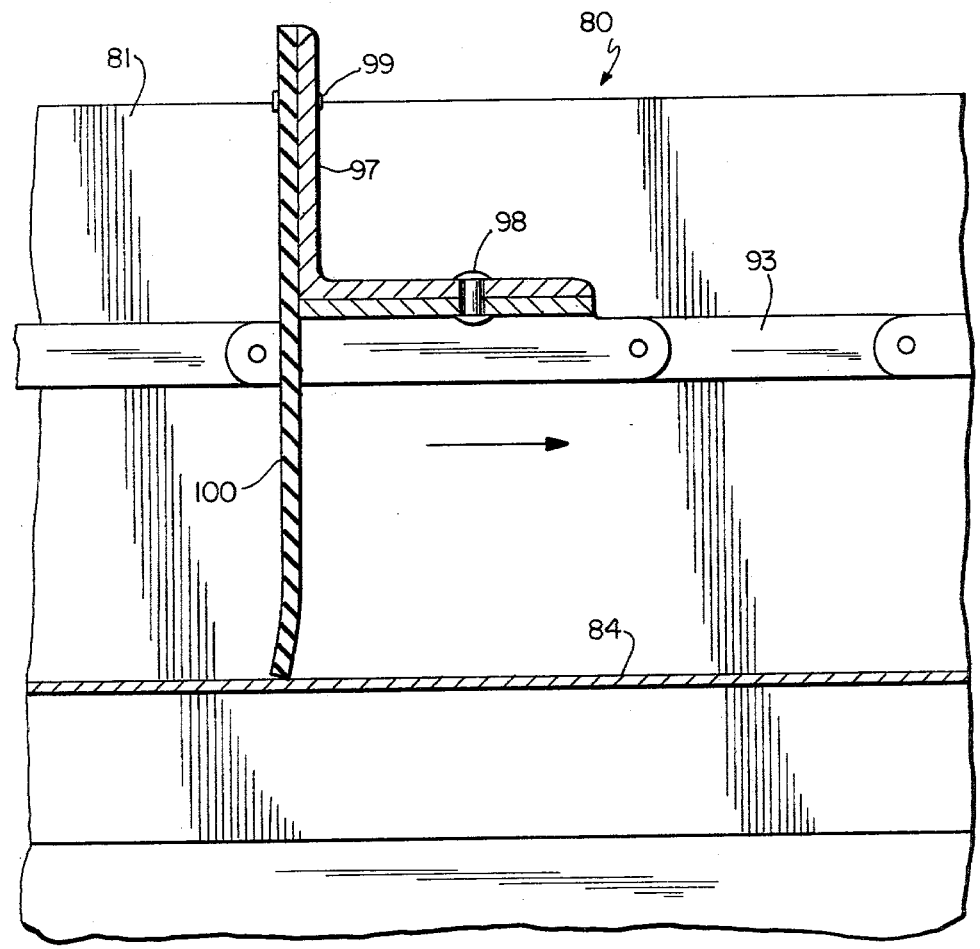
FIG. 6 is a section to an enlarged scale on the line 6—6 of FIG. 5.

In order to move the peanuts from the lower end of the table and discharge the same from the upper end, a conveyor mechanism is provided which includes a lower shaft 85 and an upper shaft 86, suitably journaled in the side frame members of the conveyor. Shaft 85 is received through elongated open slots 87, and shaft 86 through elongated closed slots 88. Each of the shafts has a sprocket 92 at each side over which endless chains 93 are engaged. As illustrated in FIGS. 3, 4 and 6, the chains have spaced crossbars 97 mounted thereon by fasteners 98. Each bracket has fasteners 99 for attaching a wiper member or scraper 100 that extends downwardly to the top of the conveyor table. Preferably, the wiper members 100 support the chains above the surface of the table. Each of the wiper members 100 has a pair of slots 101 through which the chains pass.

In the operation of the device, the sprockets 92 are suitably driven through power means on the conveyor and rotated to move the cross members carrying the wipers upwardly along the table. These preferably move at such a rate that the peanuts thereon are elevated to the highest point on the conveyor and are thrown through an arc into the front portion of the pan 70.

The wiper members or paddles are preferably of a flexible material such as woven belting which may be impregnated with or have a polyvinylchloride coating for increased durability. The use thereof results in less wear than if such members were of metal and of longer life than if they were of a material such as wood. The crossbars 97 are spaced apart at appropriate distance to move the peanuts, ten inches along the chains having been found to be a suitable distance.

In the prior U.S. Pat. No. 2,974,467 the peanuts which are separated from the vines by the lower threshing cylinder are moved upwardly by the cylinders until such peanuts are discharged through the openings in the upper concave portion of the breastplate and a substantial portion of the peanuts are not discharged until after the vines are discharged onto the vine racks. By providing openings in the lower concave portion 52 of the breastplate 51 of a size to permit peanuts to pass, most of the peanuts which are initially separated from the vines are discharged onto the conveyor 80 so that a substantial portion of the dirt and other extraneous matter is discharged from the peanuts before the peanuts are delivered to the shaker pan 70. Since most of the peanuts are separated from the vines by the first threshing cylinder, a cleaner product is delivered to the container 72. Also, since most of the peanuts are separated from the vines by the first thrashing cylinder, these peanuts then are not exposed to any further thrashing action, therefore, a higher percentage of the peanuts remain undamaged. Also, since most of the peanuts are separated from the vines by the first thrashing cylinder, these peanuts then do not have to be separated by the remaining cylinders or subsequent separating means, therefore, giving the machine a greater separating capacity resulting in a faster and/or more efficient harvesting operation.

We claim:

1. In a peanut combine for lifting and separating peanuts, vines and extraneous material and having a pickup, at least first and second threshing cylinders arranged on an incline upwardly and rearwardly from the pickup, a breastplate positioned beneath said first and second threshing cylinders, and a substantially horizontal shaker pan positioned beneath said second threshing cylinder but not beneath said first threshing cylinder, the improvement comprising said breastplate having first and second concave portions positioned below said threshing cylinders, each of said concave portions having a plurality of openings of a size to permit peanuts to fall therethrough, an inclined conveyor table having lower and upper ends and mounted beneath said first concave portion in a position to receive peanuts therefrom, said upper end of said conveyor table being mounted in a position to discharge peanuts onto said shaker pan, said conveyor table having a plurality of generally parallel longitudinally spaced slats, each of said slats having a generally flat upper surface which supports peanuts discharged from said first concave portion, the spaces between said slats being of a size to permit the passage of extraneous material but to retain the peanuts, an endless conveyor means mounted on said table, means for driving said conveyor means, said conveyor means including a plurality of spaced bars extending laterally across said table, a flexible wiper member mounted on each of said spaced bars and extending downwardly into intimate sliding engagement with the upper surfaces of said slats, whereby peanuts discharged from said first concave portion are moved upwardly along said conveyor table and are discharged into said shaker pan while extraneous material is discharged through the spaces between the slats of said table.

* * * * *